United States Patent [19]

Weinhold

[11] 4,082,320
[45] Apr. 4, 1978

[54] PIPE COUPLING
[76] Inventor: Karl Weinhold, Im Jagdfeld 43, D-4040 Neuss, Germany
[21] Appl. No.: 736,587
[22] Filed: Oct. 28, 1976
[30] Foreign Application Priority Data
 Nov. 3, 1975 Germany .............................. 2548978
[51] Int. Cl.$^2$ ............................................ F16L 27/06
[52] U.S. Cl. ...................................... 285/31; 285/261; 285/365
[58] Field of Search ................. 285/261, 409, 166, 51, 285/266, 264, 263, 262, 233, 31, 365

[56] References Cited
U.S. PATENT DOCUMENTS

| 2,369,849 | 2/1945 | Phillips | 285/263 X |
| 2,689,141 | 9/1954 | Kiekhaefer | 285/409 |
| 2,918,313 | 12/1959 | Lazar et al. | 285/261 X |
| 2,976,064 | 3/1961 | Croy | 285/266 X |
| 3,695,644 | 10/1972 | Goldberg | 285/166 X |

Primary Examiner—Thomas F. Callaghan
Attorney, Agent, or Firm—Spencer & Kaye

[57] ABSTRACT

A pipe coupling for joining the ends of two pipes together while permitting a certain angle to exist between the pipe axes, the coupling including a housing member associated with one pipe end, a plug-in member associated with the other pipe end and arranged to be inserted into the housing member to form a sealing connection therewith; two ring elements located within one of the members and together defining an inwardly directed bearing surface having the form of a spherical segment, the bearing surface portions defined by the two elements being axially spaced apart, and the pipe end associated with the one member presenting an outwardly directed bearing surface having the form of a spherical segment conforming to, and fitting closely with, the inwardly directed bearing surface.

14 Claims, 2 Drawing Figures

PIPE COUPLING

BACKGROUND OF THE INVENTION

The present invention relates to a pipe coupling for connecting together two pipe ends.

The invention is particularly directed to a connection for pipe ends which are each provided with an annular collar while one pipe end has a housing member which encloses a plug-in member provided on the other pipe end and which is sealed against its outer wall by means of an annular seal. In such a coupling, an outer annular collar is provided at the housing member and an outer annular collar is provided at the plug-in member and there is further provided a fast release lock which has releasably connected partial clamps with radially inwardly directed flanges that pass behind the two annular collars when the pipe coupling is closed.

Such pipe couplings are often required to connect together individual pieces of a pipeline, it previously having been necessary to have only exactly linear pieces in order to produce such a pipe connection. If the pipeline had to change direction or the center axes of the individual pieces of the line could no longer be accurately aligned due to even slight deviations in position or bends in the individual pieces, difficulties would arise in the establishment of the connection due to the canting existing between the plug-in member and the sleeve member, or it was impossible to establish a connection.

It could of course be conceivable to make appropriate compensations by inserting intermediate pieces which permit the coupling to be pivoted. The introduction of additional intermediate pieces, however, results in correspondingly higher expenditures for pipeline components. Additionally, it often happens that a plurality of line sections need to additionally be installed to extend the pipeline in the axial direction after the initial installation of the line sections.

SUMMARY OF THE INVENTION

It is an object of the present invention to provide a pipe coupling which permits connected line sections to be pivoted with respect to one another over a certain angular range without requiring additional intermediate pieces or the like.

This and other objects according to the invention are achieved by providing the housing member or the plug-in member with an inner annular insert which has an inwardly directed spherical segment-shaped bearing surface, the annular insert being divided in the axial direction into two ring members which are detachably connected together, and by providing the associated pipe end with an outwardly directed spherical segment-shaped bearing surface which sealingly contacts the bearing surface of the annular insert.

Such a pipe connection is structurally very simple so that the additional costs required for providing pivotability are relatively low. Individual line sections can be connected by means of such coupling so that, if required, the direction of placement of the entire pipeline can be varied. Another advantage is that the pipe coupling can also be constructed to have a relatively short structural length.

It is even conceivable to fix one of the ring members of the annular insert to, or to make it integral with, the member with which it is associated.

If, in the pipe coupling according to the invention, individual line sections of the entire pipeline need to be replaced, the coupling must be disconnected. For this purpose, it is necessary to pull apart the plug-in member and the housing member and to shift the two interconnected line sections, or the line sections to be connected, with respect to one another in the axial direction. Instead of such shifting, in the case of line sections which can be bent but slightly, the line sections can, at least for part of the axial length to be connected, be laterally pressed out from the actual pipeline, which is advantageously facilitated by the pivotability provided by the present invention. However, such a procedure is possible only in a few cases and is by no means satisfactory.

According to a further feature of the invention, the necessity for any axial shifting of the pivotally connected line sections or pipe ends during installation or removal is eliminated by constituting the housing member of an inner ring and a sleeve enclosing the plug-in member, with the inner cylindrical surface of the sleeve sealingly contacting the outer surface of the inner ring, by securing the inner ring against withdrawal from the sleeve in the direction of the end of the pipe, and by making the sleeve displaceable on the inner ring.

In this latter embodiment the partial clamps of the quick release lock can be raised from the annular collars at the plug-in member and at the sleeve so that the sleeve can be pushed in the axial direction onto its associated pipe end. Both pipe ends are thus free to laterally move with respect to one another so that the line section to be replaced can be moved while adjacent line sections remain in their respective positions.

The pipe coupling according to this embodiment thus provides pivotability to enable the direction of the pipe line to be varied to follow bends and to compensate for inaccuracies in position or the like, while additionally providing for more convenient mounting of the line sections. The pipe coupling itself is simple to manufacture and assemble because the structural division of the annular insert into the two ring members permits the part of the pipe end which bears the spherical segment-shaped bearing surfaces to be inserted in a simple manner.

The spherical segment-shaped bearing surfaces may thus be disposed either in the plug-in member or in the housing member. If the latter is the case and the housing member is composed of a sleeve which can be displaced on an inner ring, it is of advantage, according to a further embodiment of the invention, for the inner ring to be constituted by the parts of the annular insert.

In this embodiment, an inwardly extending annular flange of the sleeve may also engage the inner ring or the ring insert at its end facing the pipe end.

Further in connection with this embodiment, the ring members forming the inner ring of the housing member can have annular reinforcing portions on the outside on which the sleeve rests, via its inner surface, while an annular gap remains in the region between reinforcing portions. In this way, two defined guide regions are formed between the annular insert or the ring members, respectively, on the one hand, and the sleeve on the other hand, so that jamming of these parts against one another, for example as a result of dirt, will not unnecessarily hamper the displacement. In order to seal the annular insert relative to the sleeve, an annular sealing ring may be inserted in the reinforcing portion facing the plug-in member.

In further accordance with the invention, the front reinforcing portion on the annular insert facing the plug-in member can have a larger external diameter than the rear reinforcing portion facing the pipe end, and the inside of the sleeve can be provided with an annular shoulder whose height corresponds to this difference in diameters, the shoulder bordering directly on the front reinforcing portion. If necessary, such an annular shoulder can also serve as an abutment which holds the annular insert and the associated pipe end in the sleeve in the axial direction when the pipe coupling is closed.

According to a further embodiment of the invention, in the area enclosed by the housing member the outer diameter of the plug-in member can be greater than the outer diameter of the front reinforcing portion of the annular insert facing the plug-in member on which the sleeve slides after release of the quick release lock during axial displacement. In addition, the associated cylindrical inner surfaces of the sleeve will have correspondingly different diameters.

With these embodiments it is accomplished that during axial displacement after release of the quick release lock the sleeve need slide on guide or sealing surfaces only over a relatively short path before it is free of these surfaces in the radial direction, and can then be displaced much easier.

The front and rear ring members of the annular insert may be connected together from the rear side facing the pipe end by means of an axial screw connection. It is conceivable in this connection for the inwardly extending annular flange of the sleeve to at least partly cover the screw connection.

In further accordance with the invention, an annular sealing ring can be inserted into the spherical segment-shaped bearing surfaces of the ring member facing the point of impact between plug-in member and housing member. By locating the sealing ring as closely as possible to the joining plane between the pipe ends, the annular sealing ring can produce not only a seal but can simultaneously also protect the spherical segment-shaped bearing surface against impurities, dirt or the like.

In connection with the embodiment in which the spherical segment-shaped bearing surfaces are disposed in the plug-in member, one ring member disposed in the plug-in member can be made of one piece with the plug-in member and the other ring member can be held in the plug-in member by adial pins or the like which are inserted into the cylindrical outer surface of the plug-in member and pass therethrough. The actual guide surface of the plug-in member is thus not interferred with by the insertion of the pins. The pins may of course also be replaced by screws.

DESCRIPTION OF THE PREFERRED EMBODIMENTS

Figure 1:
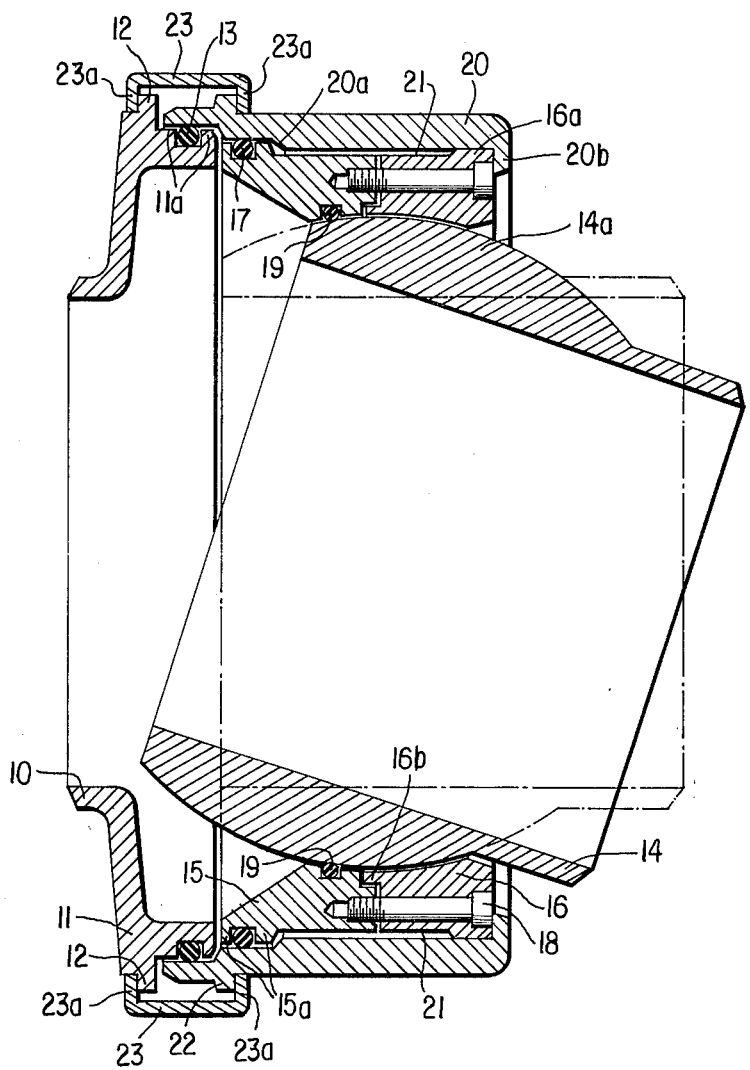
FIG. 1 is a longitudinal cross-sectional view of one embodiment of a pipe coupling according to the invention in which an annular insert with spherical segment-shaped bearing surfaces is disposed in a housing member.

In the embodiment shown in FIG. 1, the end 10 of one pipe to be connected is provided with a plug-in member 11 having an external annular collar 12. The plug-in portion 11 has a cylindrical exterior guide surface 11a into which an annular seal 13 is inserted.

The end 14 of a second pipe has the form of a spherical segment-shaped bearing element 14a which is held in an annular insert formed of two ring members 15 and 16 with spherical segment-shaped inner surfaces corresponding to that of element 14a. The front ring member 15 facing plug-in member 11 is provided at its end with an annular reinforcing portion 15a having an annular groove into which an annular seal 17 is inserted. The rear ring member 16 similarly has at its rear end an annular reinforcing portion 16a. The front and rear ring members 15 and 16 are held together by means of axially extending screws 18 which are distributed around the periphery of the assembly and which are screwed into threaded bores in ring member 15 from the pipe end 14 while passing through ring member 16.

In order to better align the two ring members 15 and 16 with one another, ring member 16 is provided with an axial protrusion 16b which mates with a corresponding recess in ring member 15. An annular sealing ring 19 is inserted into a groove in the spherical segment-shaped inner surface of the front ring member 15 and is located as closely as possible to the extremity of that surface which is closer to pipe end 10 to provide an effective seal between the surface of bearing element 14a and member 15.

The two annular reinforcing portions 15a and 16a of ring sections 15 and 16 serve as a seat for a sleeve 20 which constitutes a housing member. An annular gap 21 is present between the two portions 15a and 16a. Portion 15a is formed to have a larger outer diameter than does portion 16a, and a sloping annular shoulder 20a is formed at the interior of sleeve 20 directly next to portion 15a.

At its outer surface, sleeve 20 is further provided with an outwardly projecting annular collar 22 while at the side facing pipe end 14 it terminates with an inwardly projecting annular flange 20b which in part covers screws 18.

The outer diameter of guide surface 11a of plug-in member 11 is greater than the outer diameter of annular reinforcing portion 15a. Consequently, the end portion of sleeve 20 which is directed toward pipe end 10 has a larger inner diameter than the portion adjacent thereto, the cylindrical inner surface of the latter portion contacting the periphery of portion 15a when the pipe coupling is closed.

The annular collar 12 of plug-in member 11 and the annular collar 22 of sleeve 20 are held relative to one another by lateral clamping flanges 23a which are part of partial clamps 23. Usually there are two or three partial clamps 23 which are held together at one point by means of a clamping lever lock while they are otherwise connected to form a joint and enclose the periphery of such a pipe coupling.

The described pipe coupling operates as follows:

If the pipe coupling shown in the drawing is to be released, the clamping lever lock (not shown here) is opened so that partial clamps 23 can be removed. Thereafter, sleeve 20 can be removed from guide surfaces 11a of plug-in member 11 in the direction toward pipe end 14 and can be pushed onto pipe end 14 to the extent required. If sleeve 20 is initially displaced only by an amount which corresponds to the axial length of guide surfaces 11a, sleeve 20 will no longer rest on the cylindrical outer surface of annular reinforcing portion 15a so that from this time of displacement on only a very small force is required.

Alternatively, if required, one of the pipe ends 10 or 14 may be moved radially relative to the other, or both pipe ends may be moved radially with respect to one another, so that corresponding sections of line can be replaced without axially shifting them. Furthermore, pipe end 14 can also be pivoted with respect to the center axis of pipe end 10 within the possible pivot range even if the pipe coupling is closed. In any event, the annular sealing ring 19 will maintain a tight seal.

Figure 2:
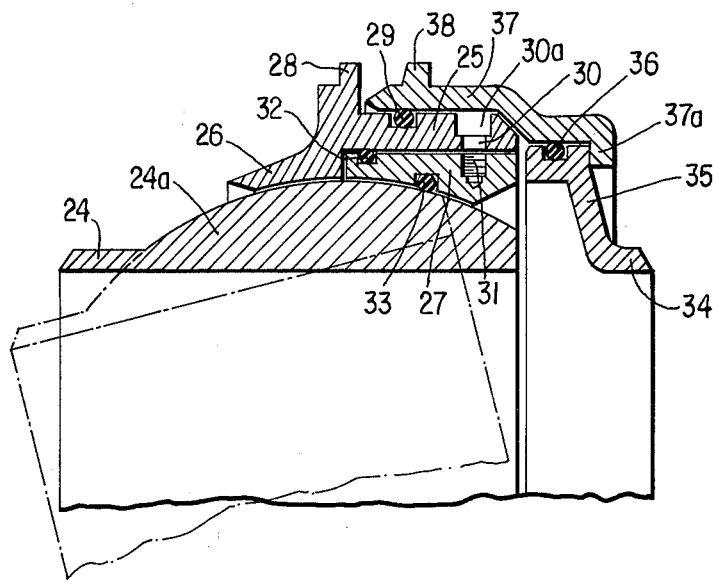
FIG. 2 is a longitudinal cross-sectonal detail view of a portion of an embodiment of a pipe coupling according to the invention in which the annular insert with the spherical segment-shaped bearing surfaces is disposed in the plug-in member.

In the embodiment shown in FIG. 2, the end 24 of one pipe is provided with a bearing element 24a with a spherical segment-shaped outer surface. Substantially within a plug-in member 25 there is disposed an annular insert presenting spherical segment-shaped inner surfaces corresponding to the outer surface of element 24a. This annular insert is divided into a first ring member 26 which is integral with member 25 and a second ring member 27 which is releasably inserted into member 25 on the side facing the frontal face of member 25, the frontal face being that facing the end 34 of the other pipe.

Member 25 is provided with an external, outwardly projecting annular collar 28. Starting from collar 28, the actual cylindrical outer guide surface extends to the end of member 25, an annular sealing ring 29 being placed in an annular groove formed in that guide surface. Furthermore, the outer guide surface of member 25 is provided with bores 30 each aligned with a respective bore 31 in ring member 27. The latter can thus be releasably fastened in member 25 by means of pins, screws or the like which are inserted into bores 30 and 31. The outer portion of bore 30, for example, may be formed as an annular groove 30a which extends around the entire periphery of member 25.

The cylindrical outer surface of member 27 is provided, at a location as far from pipe end 34 as possible, with an annular sealing ring 32 inserted into a groove formed in the cylindrical outer surface of ring member 27. On the inside surface of ring member 27, a further annular sealing ring 33 is provided in the same manner in a suitable groove to effect a seal between ring member 27 and bearing element 24a.

The other pipe end 34 is provided with an inner ring 35 presenting a cylindrical outer surface and having an annular sealing ring 36 disposed in a groove in that outer surface. The inner ring 35 is enclosed by a sleeve 37 which forms the actual housing of the housing member and is axially displaceable on inner ring 35. The cylindrical inner surface of sleeve 37 can be pushed onto the outer guide surface of member 25 up to the position shown in FIG. 2. An annular collar 38 at the outside of sleeve 37 and annular collar 28 on member 25 are then held in the same manner as shown in the embodiment of FIG. 1 by the partial clamps of a quick release lock. In this position, i.e. when the pipe coupling is closed, an inner annular flange 37a of sleeve 37 holds inner ring 35.

Furthermore, the part of sleeve 37 which surrounds member 25 has a larger effective inner diameter than the sleeve part which surrounds inner ring 35. This difference in diameters serves the same purpose as that provided in the embodiment of FIG. 1 on the inner surface of sleeve 20, i.e. to reduce friction or to reduce the force required to displace sleeve 37, as soon as sleeve 37 is no longer or not yet directly sliding on inner ring 35.

In any event, after the pipe coupling has been released, sleeve 37 can again be pushed onto pipe end 34 far enough that the two pipe ends 24 and 34 can be moved axially toward one another without prior displacement.

According to a modification of the above-described two embodiments, one of the ring members 15 or 16 of FIG. 1, for example, can be made to constitute a structural unit with sleeve 20 or can be made integral therewith. The axial displaceability of sleeve 20 is then eliminated. Of course, no annular seal is then required between ring members 15 and 16 on the one hand and sleeve 20 on the other.

In the embodiment shown in FIG. 2, it is conceivable in a corresponding manner to combine sleeve 37 structurally with inner ring 35, this also causing a loss of displaceability.

It will be understood that the above description of the present invention is susceptible to various modifications, changes and adaptations, and the same are intended to be comprehended within the meaning and range of equivalents of the appended claims.

What is claimed is:

1. In a pipe coupling for connecting together the ends of two pipes and composed of coupling components associated with respective pipe ends, the coupling components including two outwardly projecting annular collars each associated with a respective pipe end, a housing member associated with and forming a sealed connection with one of the pipe ends, a plug-in member associated with and forming a sealed connection with the other pipe end and arranged to be inserted in the housing member, and a first sealing ring disposed to provide a sealing connection between the members when the plug-in member is inserted in the housing member, the coupling further including a quick release lock composed of a plurality of partial clamps each having a pair of spaced, radially inwardly directed flanges arranged to fit around the annular collars to hold the coupling in its assembled condition with the plug-in member inserted into the housing member, the improvement wherein: said coupling components associated with one of said members include two ring elements located within said one member and formed to present an inwardly directed bearing surface having the form of a spherical segment, each said ring element presenting a portion of said bearing surface, with the bearing surface portions being spaced apart in the axial direction of said coupling, and means detachably connecting said ring elements together; said pipe end associated with one of said members is formed to present an outwardly directed bearing surface having the form of a spherical segment corresponding to that of, and in close contact with, the inwardly directed bearing surface; and said housing member is constructed to be axially displaceable relative to said one of the pipe ends in the direction away from said plug-in member and to prevent axial movement of said one of the pipe ends relative to said housing member in the direction away from said plug-in member, whereby axial displacement of said housing member away from said plug-in member enables said one of the pipe ends to be displaced laterally relative to said other pipe end without requiring axial displacement of said pipe ends relative to one another.

2. An arrangement as defined in claim 1 wherein one of said ring elements forms a unit with its associated member.

3. An arrangement as defined in claim 1 wherein said housing member is composed of an inner ring and a sleeve, said sleeve surrounding said plug-in member in the assembled state of said coupling, said sleeve presenting a cylindrical inner surface in close contact with the outer surface of said inner ring and said sleeve being displaceable relative to said inner ring in the axial direction away from said plug-in member, and said housing member includes means for preventing movement of said inner ring out of said sleeve in the axial direction away from said plug-in member.

4. An arrangement as defined in claim 3 wherein said means for preventing movement of said inner ring comprise an inwardly extending annular flange of said sleeve disposed adjacent the end of said inner ring directed away from said plug-in member.

5. An arrangement as defined in claim 3 wherein said housing member constitutes said one of said members and said inner ring is constituted by said two ring elements.

6. An arrangement as defined in claim 5 wherein said ring elements each have an annular reinforcing portion projecting outwardly from their outer surfaces and the inner surface of said sleeve rests on said projecting portions, and said ring elements present an annular recess at their outer surfaces in the region between said annular reinforcing portions.

7. An arrangement as defined in claim 6 further comprising a second sealing ring seated in that one of said reinforcing portions which is closer to said plug-in member.

8. An arrangement as defined in claim 6 wherein that one of said reinforcing portions which is closer to said plug-in member has a greater external diameter than does the other one of said reinforcing portions and the inner surface of said sleeve is provided with an annular shoulder which corresponds in radial height to this difference in diameters and which is immediately adjacent said one of said reinforcing portions.

9. An arrangement as defined in claim 6 wherein the portion of said plug-in member inserted in said housing member has an external diameter larger than the external diameter of that one of said reinforcing portions which is closer to said plug-in member, and the inner surface of said sleeve presents regions of respectively different diameters corresponding to said external diameters of said plug-in member portion and said one of said reinforcing portions at the locations facing those portions when said coupling is in its assembled condition.

10. An arrangement as defined in claim 5 further comprising a plurality of axially extending screws extending from the end of said housing member remote from said plug-in member and connecting said ring elements together.

11. An arrangement as defined in claim 10 wherein said sleeve is provided with an inwardly extending annular flange at least partly covering said screws.

12. An arrangement as defined in claim 3 wherein said inner ring is provided with an outwardly projecting annular reinforcing portion, the portion of said plug-in member inserted in said housing member has an external diameter larger than that of said annular reinforcing portion, and the inner surface of said sleeve presents regions of respectively different diameters corresponding to said external diameters of said plug-in member portion and said reinforcing portion at the locations facing those portions when said coupling is in its assembled condition.

13. An arrangement as defined in claim 1 further comprising a third sealing ring seated in said inwardly directed bearing surface near the axial end thereof which faces the other of said members.

14. An arrangement as defined in claim 1 wherein said one member containing said two ring elements is constituted by said plug-in member, that one of said ring elements which presents the bearing surface portion remote from said housing member is integral with said plug-in member, and said coupling further comprises a plurality of radially extending fastening elements extending from the outer lateral surface of said plug-in member and into the other of said ring elements for holding said other ring element in said plug-in member.

* * * * *